United States Patent
Ikeda et al.

(10) Patent No.: US 7,076,725 B2
(45) Date of Patent: Jul. 11, 2006

(54) DIGITAL DATA RADIO RECEIVING DEVICE AND METHOD

(75) Inventors: Yasunari Ikeda, Kanagawa (JP);
Norihisa Shirota, Kanagawa (JP);
Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 311 days.

(21) Appl. No.: 10/129,200

(22) PCT Filed: Sep. 7, 2001

(86) PCT No.: PCT/JP01/07800

§ 371 (c)(1),
(2), (4) Date: Sep. 16, 2002

(87) PCT Pub. No.: WO02/21755

PCT Pub. Date: Mar. 14, 2002

(65) Prior Publication Data

US 2003/0129999 A1    Jul. 10, 2003

(51) Int. Cl.
*H03M 13/03* (2006.01)
(52) U.S. Cl. ............................. 714/789; 714/775
(58) Field of Classification Search ............. 375/145; 327/156; 714/699, 798, 700, 775
See application file for complete search history.

(56) References Cited

U.S. PATENT DOCUMENTS

| | | | |
|---|---|---|---|
| 4,768,033 A * | 8/1988 | Sakai et al. | 455/45 |
| 4,953,197 A | 8/1990 | Kaewell, Jr. et al. | |
| 4,977,577 A * | 12/1990 | Arthur et al. | 375/146 |
| 5,708,961 A * | 1/1998 | Hylton et al. | 725/81 |
| 5,737,372 A * | 4/1998 | Barham et al. | 375/145 |
| 5,751,707 A * | 5/1998 | Voit et al. | 370/384 |
| 5,796,777 A | 8/1998 | Terlep et al. | |
| 5,867,538 A * | 2/1999 | Liu | 375/341 |
| 5,974,101 A * | 10/1999 | Nago | 375/350 |
| 6,230,021 B1 * | 5/2001 | Ohdachi | 455/502 |
| 6,665,348 B1 * | 12/2003 | Feher | 375/259 |

FOREIGN PATENT DOCUMENTS

| | | |
|---|---|---|
| EP | 1 223 688 A2 | 7/2002 |
| JP | 62-137933 | 6/1987 |

(Continued)

OTHER PUBLICATIONS

Patent Abstract of JP 62137933, App. No. 60279901, Publ. Date Jun. 20, 1987, Inventor: Yoneyama Fujio.

(Continued)

*Primary Examiner*—Guy Lamarre
*Assistant Examiner*—Mujtaba K. Chaudry
(74) *Attorney, Agent, or Firm*—Finnegan, Henderson, Farabow, Garrett & Dunner, L.L.P.

(57) ABSTRACT

A wireless relay system (1) comprises a wireless camera (11) and a reception relay station (12). The reception relay station (12) comprises a plurality of external reception units (13) arranged at spatially different positions and an internal reception unit (14). Each reception section (16) in the internal reception unit (14) demodulates a signal received in the external reception unit (13) and outputs a transport stream. At this time, each reception section (16) sets an error indicator flag to 1 for a TS packet causing a transmission error which exceeds the error correction capability. A TS synthesizer section (17) in the internal reception unit (14) completely synchronizes a plurality of input transport streams by referencing synchronization bytes, PID, and CC values, and selects to output a TS packet having the error indicator flag not set to 1.

26 Claims, 5 Drawing Sheets

FOREIGN PATENT DOCUMENTS

| | | |
|---|---|---|
| JP | 64-39842 | 2/1989 |
| JP | 1-265739 | 10/1989 |
| JP | 2-279029 | 11/1990 |
| JP | 6-6328 | 1/1994 |
| JP | 9-64806 | 3/1997 |
| JP | 10-145342 | 5/1998 |

OTHER PUBLICATIONS

Patent Abstract of JP 11205273, App. No. 10002509, Publ. Date Jul. 30, 1999, Inventor: Namekata Minoru.

European Search Report, dated Sep. 28, 2005 for Application No. 01963530.9-2411 PCT/JP0107800.

* cited by examiner

DIGITAL DATA RADIO RECEIVING DEVICE AND METHOD

TECHNICAL FIELD

The present invention relates to a wireless receiver and method for receiving a signal transmitted wirelessly from one transmitter and demodulating a digital data sequence.

BACKGROUND ART

Conventionally, a wireless camera is used to photograph a relaying scene for televising news programs, sports programs, various event programs, etc. This wireless camera generates a video or voice signal and transmits the signal to a base station such as a relay mobile by means of the ground wave radio communication. Compared to a cable-connected camera, the wireless camera saves labor of installing or removing cables and increases flexibility of camera angles and photographing positions. This improves mobility of the camera at the scene.

Further, in recent years, the wireless camera transmission system is increasingly using a digital modulation system which digitizes video or voice signals.

It is important for a relay system using the digitized wireless camera to improve transmission quality between the base station such as a relay mobile and the transmitting camera so as to ensure stable reception even under a so-called fading environment. It is desired to widen the movable range of the camera for ensuring the mobility essential to the wireless camera. For example, it is desired to receive a transmission signal from the camera by using a plurality of antennas arranged at positions differing from each other for a wide range of reception.

The so-called diversity reception system is known as a radio transmission technology capable of providing high transmission quality. This system receives a transmission wave by means of a plurality of antennas and selects or synthesizes received signals in the RF/IF region according to the levels. However, the diversity reception requires selection and synthesis in the RF/IF region, causing a restriction of arranging a plurality of antennas physically close to each other. Accordingly, the use of the diversity reception technology has been difficult when a plurality of receivers are arranged at different positions for ensuring the wireless camera's mobility.

DISCLOSURE OF THE INVENTION

It is an object of the present invention to provide a wireless receiver and wireless reception method which improves the transmission quality and can ensure the transmitter's mobility by enhancing a movable range of the transmitter for mobile transmission.

A wireless receiver according to the present invention comprises: a plurality of reception means for receiving a signal transmitted wirelessly from one transmitter, demodulating a digital data sequence, and error-correcting a demodulated digital data sequence; synchronization means for synchronizing a plurality of digital data sequences output from each reception means; and synthesis means for synthesizing a plurality of synchronized digital data sequences and outputting one digital data sequence, wherein the synthesis means selects one of a plurality of digital data sequences to be synthesized according to a transmission error state of each digital data sequence.

This wireless receiver uses a plurality of reception sections to receive a transmission signal transmitted wirelessly from one transmitter. Each reception section demodulates a series of digital data and error-corrects the demodulated digital data sequence. The wireless receiver synchronizes a plurality of digital data sequences output from respective receivers. According to transmission error states of the respective digital data sequences, the wireless receiver selects one of a plurality of synchronized digital data sequences to synthesize it into one digital data sequence.

Further, the wireless receiver according to the present invention provides a digital data sequence containing a transmission error even after error correction processing with error indication information indicating that the transmission error is contained therein; and selects one of a plurality of digital data sequences based on the error indication information for synthesis into a single digital data sequence.

A radio reception method according to the present invention uses a plurality of receivers to receive a signal transmitted wirelessly from one transmitter and allowing each receiver to demodulate a digital data sequence and error-correct the demodulated digital data sequence; synchronizes a plurality of digital data sequences output from respective receivers; and selects one of a plurality of synchronized digital data sequences according to transmission error states of respective digital data sequences for synthesis into a single digital data sequence and outputs one synthesized digital data sequence.

This radio reception method uses a plurality of reception sections to receive a transmission signal transmitted wirelessly from one transmitter. Each reception section performs demodulates a digital data sequence and error-corrects the demodulated digital data sequence. The wireless receiver synchronizes a plurality of digital data sequences output from respective receivers. According to transmission error states of the respective digital data sequences, the wireless receiver selects one of a plurality of synchronized digital data sequences to synthesize it into one digital data sequence.

Further, the radio reception method according to the present invention provides a digital data sequence containing a transmission error even after error correction processing with error indication information indicating that the transmission error is contained therein; and selects one of a plurality of digital data sequences based on the error indication information for synthesis into a single digital data sequence.

BEST MODE FOR CARRYING OUT THE INVENTION

As an embodiment of the present invention, the following describes a ground digital wireless relay system (hereafter referred to simply as the wireless relay system) used to photograph a relaying scene for televising news programs, sports programs, various event programs, etc.

Figure 1:
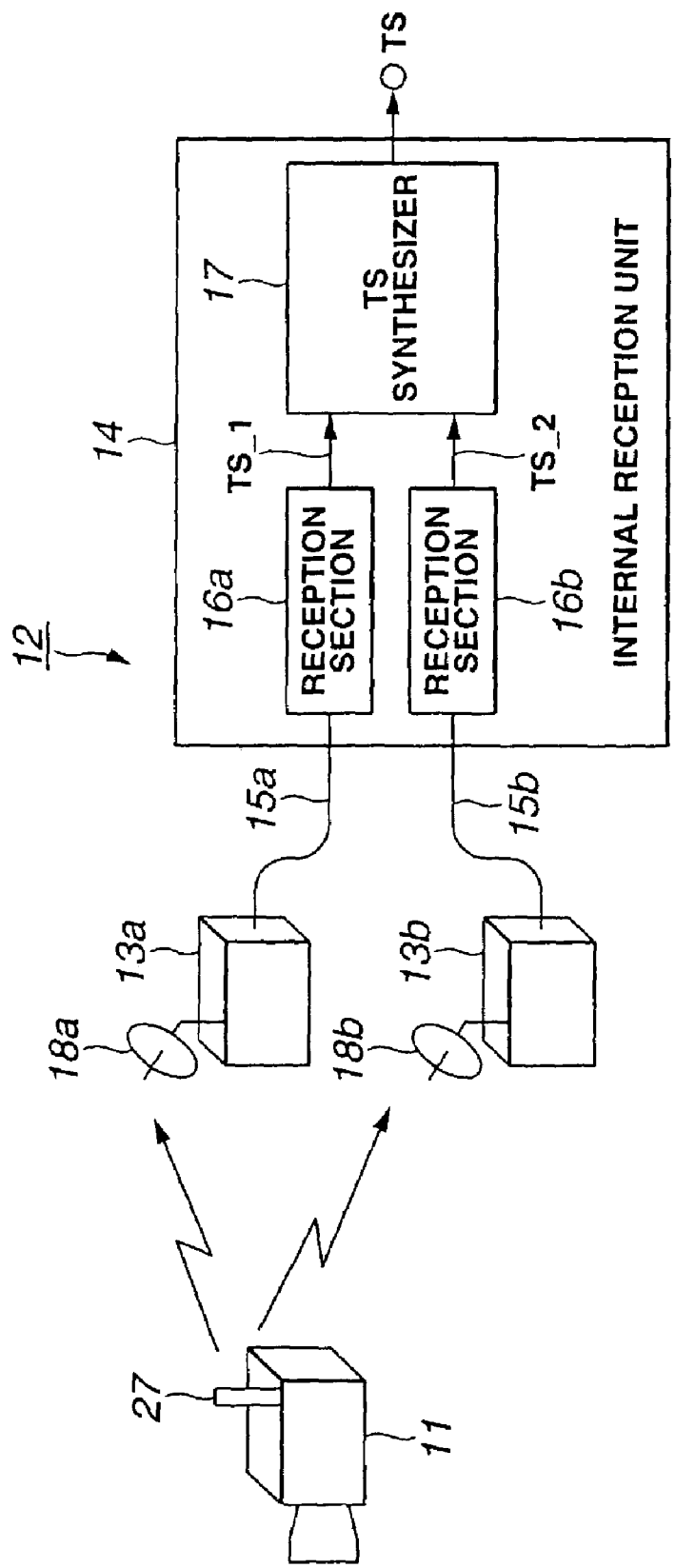
FIG. 1 is a configuration diagram of a wireless relay system to which the present invention is applied.

FIG. 1 shows a configuration diagram of the wireless relay system according to the embodiment of the present invention.

As shown in FIG. 1, a wireless relay system comprises a wireless camera 11 for photographing a subject and a reception relay station 12 for receiving a signal transmitted from the wireless camera 11.

The wireless relay system 1 is used to photograph a relaying scene for televising news programs, sports programs, various event programs, etc. Using the ground wave, the system transmits wirelessly a video signal etc. for a material video taken by the wireless camera 11 to the reception relay station 12. Since no cable is needed between the camera and the relay station, the wireless relay system 1 does not restrict camera angles or photography positions, thus improving the camera mobility at photographing scenes.

The wireless relay system 1 uses a transport stream specified in the MPEG2 Systems standard as a radio transmission signal to the reception relay station 12 from the wireless camera 11. Further, the wireless relay system 1 uses OFDM (Orthogonal Frequency Division Multiplexing) as a modulation system. Since the transport stream is used by digitizing a video material, it is possible to transmit high-quality images and sound with little S/N degradation compared to transmission of video materials in an analog form. The OFDM modulation system is less susceptible to image quality degradation due to a field intensity variation resulting from the mobile reception and mitigates the effects of multipath interference. Accordingly, the use of the OFDM modulation system makes it possible to transmit high-quality images and sound.

The configuration of the wireless camera 11 will now be described with reference to FIG. 2.

Figure 2:
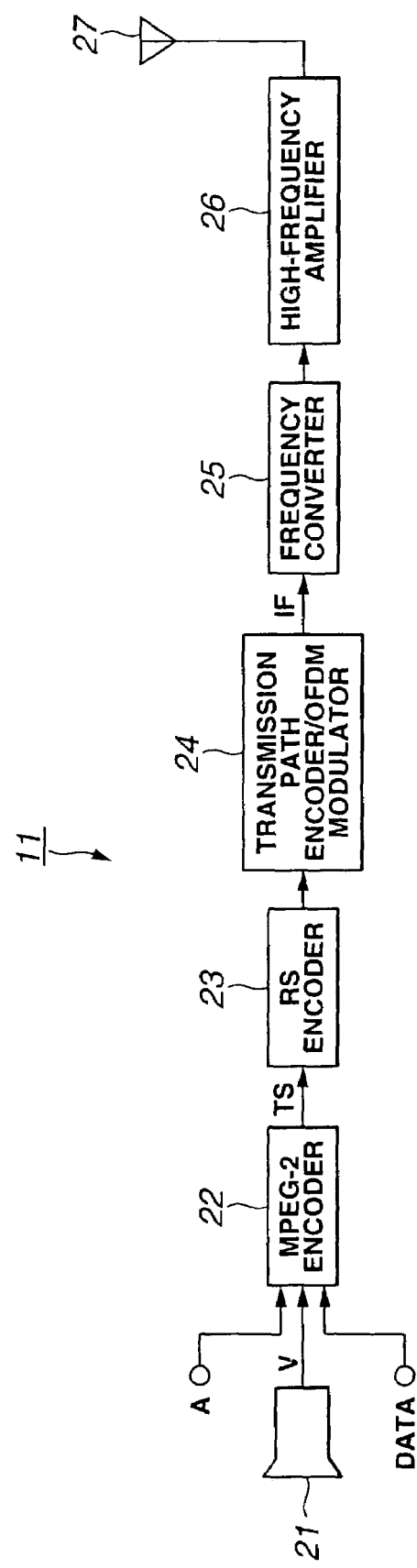
FIG. 2 is a block diagram of a wireless camera in the wireless relay system.

As shown in FIG. 2, the wireless camera 11 comprises an image pickup section 21, an MPEG2 encoder 22, an RS encoder 23, a transmission path encoder/OFDM modulator 24, a frequency converter 25, a high-frequency amplifier 26, and a transmission antenna 27.

The image pickup section 21 comprises an image pickup optical system, a CCD image sensor, an A/D converter, a camera signal processor, etc. The CCD image sensor transforms an image pickup signal into an electric signal. The image pickup section 21 functions as a module which converts this electric signal into a digital video signal by performing analog/digital conversion and timing processing. The digital video signal output from the image pickup section 21 is supplied to the MPEG2 encoder 22.

The MPEG2 encoder 22 is supplied with a digital video signal from the image pickup section 21, a digital sound signal input from a microphone etc. and digitized, and a specified data signal. The MPEG2 encoder 22 compresses and encodes these signals according to the MPEG2 format. The MPEG2 encoder 22 multiplexes the compressed data to create a transport stream specified in the MPEG2 Systems standard. The transport stream comprises a 188-byte fixed length transport packet (TS packet). A TS packet payload describes video, audio, data, etc. The transport stream generated in the MPEG2 encoder 22 is supplied to the RS encoder 23.

The RS encoder 23 performs the Reed-Solomon coding in units of 188-byte TS packets to generate a transmission packet provided with a 16-byte RS parity, for example. The transport stream provided with the RS parity is supplied to the transmission path encoder/OFDM modulator 24.

The transmission path encoder/OFDM modulator 24 applies the following specified transmission path coding processes to the transport stream provided with the RS parity. These transmission path coding processes include convolutional interleave processing, inner code encoding, bit interleave processing, symbol interleave processing, modulation-compliant mapping, OFDM frame configuration processing such as inserting a specified pilot or null signal, etc. Further, the transmission path encoder/OFDM modulator 24 performs the following OFDM modulation processes for a transmission path encoded data stream. For example, an orthogonal transform processes data comprising 2,048 sets of IQ signals as a single symbol and converts this data to an OFDM signal in the time area by performing the IFFT (Inverse Fast Fourier Transform) processing. A guard interval addition processes adds a guard interval to an OFDM signal in the time area by copying the second half of a single effective symbol to the first half of the symbol. An orthogonal modulating process generates an IF signal in the intermediate frequency band by orthogonally modulating an OFDM signal provided with the guard interval in the time area. The IF signal output from the transmission path encoder/OFDM modulator 24 is supplied to the frequency converter 25.

The frequency converter 25 upconverts a carrier frequency in the IF signal to an RF signal to be transmitted into the air. The RF signal is supplied to the high-frequency amplifier 26.

The high-frequency amplifier 26 amplifies the RF signal to a high frequency and transmits the signal into the air from the transmission antenna 27.

The reception relay station 12 receives the signal transmitted from the thus configured wireless camera 11.

According to the above-mentioned configuration, the wireless camera 11 can encode picked up material video into a transport stream, OFDM-modulate this transport stream, and transmit it to the reception relay station 12 using the ground wave.

The reception relay station 12 will now be described.

As shown in FIG. 1, the reception relay station 12 comprises a plurality of external reception units 13 (first reception section 13a and second reception section 13b), one internal reception unit 14, and a plurality of IF cables 15 (first IF cable 15a and second IF cable 15b) connecting each external reception unit 13 and the internal reception unit 14. The internal reception unit 14 comprises a plurality of reception sections 16 (first reception section 16a and second reception section 16b) corresponding to the external reception units 13 and a TS synthesizer section 17. While the description here uses an example using two external reception units 13, the present invention is not limited thereto. It may be preferable to provide three or more external reception units 13.

The external reception unit 13 uses a reception antenna 18 to receive a signal transmitted from the wireless camera 11 and converts the received signal to an IF signal of the intermediate frequency band. The IF signal output from each external reception unit 13 is supplied to each reception section 16 in the internal reception unit 14 via the corresponding IF cable 15 (15a or 15b).

The external reception units 13 are arranged at spatially different positions or by changing directivities of the reception antennas 18. During play-by-play broadcasting of a baseball game, for example, the external reception units 13 are arranged so that at least one of them can receive a transmission wave from the wireless camera 11 even if a photographer moves to any position in the field.

For example, there may be a case where an obstacle between the external reception unit 13 and the wireless camera 11 interrupts a transmission wave or extend the distance therebetween. Moreover, there may be a case where the wireless camera 11 moves outside the directivity range of the reception antenna 18, making reception of the corresponding external reception unit 13 difficult. In these cases, arranging the external reception units 13 as mentioned above provides uninterrupted transmission only if one of external reception units 13 can ensure reception from the wireless camera 11. Accordingly, if a plurality of external reception units is configured so that they can cover a specified photographic range, a movable range of the wireless camera 11 widens. Namely, it is possible to widen a range of receiving a transmission wave from the wireless camera 11.

Each reception section 16 in the internal reception unit 14 demodulates the transport stream transmitted from the wireless camera 11 by performing the channel selection to select a specified frequency from the input IF signal, the OFDM demodulation/transmission path decoding, the RS decoding, etc. Both transport streams output from the reception sections 16 are data obtained from the same source by receiving the transmission wave from the wireless camera 11. Because different data transmission paths are used, however, the transport streams cause a transmission timing deviation or different transmission error states. Now, suppose that a transport stream output from the first reception section 16a is TS_1 and a transport stream output from the second reception section 16b is TS_2. These TS_1 and TS_2 are supplied to the TS synthesizer section 17.

The TS synthesizer section 17 in the internal reception unit 14 synchronizes transmission timings of TS_1 and TS_2. According to transmission error states of the transport streams, the TS synthesizer section 17 selectively switches TS_1 and TS_2 and synthesizes them into a single transport stream for output.

The transport stream output from the TS synthesizer section 17 is transmitted to a broadcasting station where the information is processed and is distributed to the audience, for example.

Figure 3:
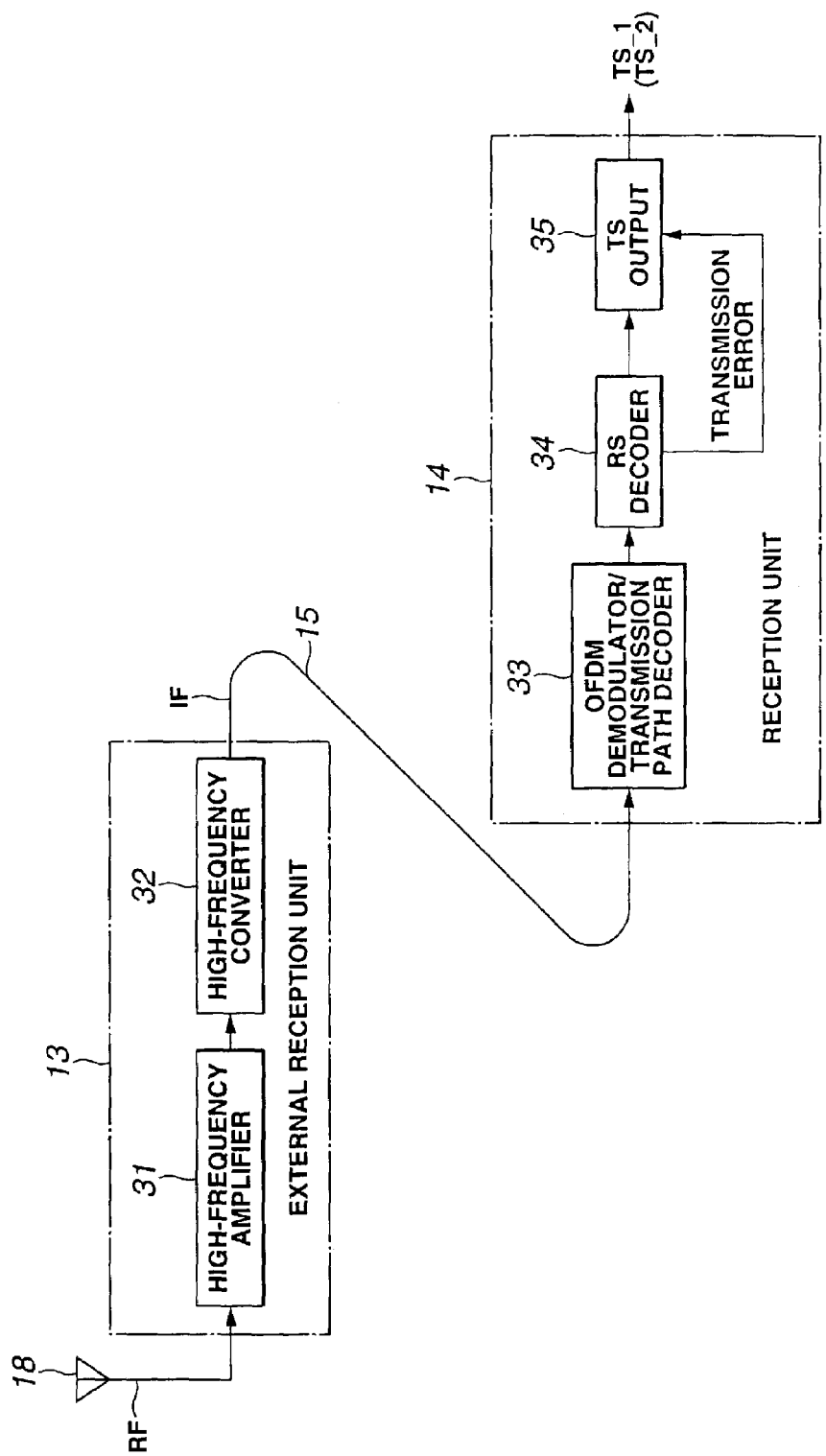
FIG. 3 is a block diagram of an external reception unit of the wireless relay system and a reception section in an internal reception unit.

The following describes the configuration of the external reception unit 13 and the configuration of the reception section 16 in the internal reception unit 14 with reference to FIG. 3. This system is provided with a plurality of external reception units 13 and a plurality of reception sections 16. Each of them has the same configuration, respectively.

The external reception unit 13 comprises the reception antenna 18, a high-frequency amplifier 31, and a frequency converter 32. The reception section 16 in the internal reception unit 14 comprises an OFDM demodulator/transmission path decoder 33, an RS decoder 34, and a TS output section 35.

The reception antenna 18 receives a transmission wave transmitted from the wireless camera 11 and supplies it to the high-frequency amplifier 31.

The high-frequency amplifier 31 amplifies an RF signal received at the reception antenna 18 to high frequency. The high-frequency amplified RF signal is supplied to the frequency converter 32.

The frequency converter 32 downconverts the high-frequency amplified RF signal to an IF signal with a specified carrier frequency. The frequency-converted IF signal is supplied to the OFDM demodulator/transmission path decoder 33 in the reception section 16 via the IF cable 15.

The OFDM demodulator/transmission path decoder 33 performs the channel selection and the orthogonal demodulation for the input IF signal. Further, the OFDM demodulator/transmission path decoder 33 performs various synchronization processes such as FFT window synchronization, symbol timing synchronization, etc., and concurrently performs OFDM demodulation processes for transmission data demodulation. The OFDM demodulation processes include orthogonal transform, waveform equalization, demapping, etc. which perform FFT (Fast Fourier Transform) for each effective symbol to transform it into an OFDM signal in the frequency area. Moreover, the OFDM demodulator/transmission path decoder 33 decodes the demodulated transmission data by performing the transmission path decoding such as symbol deinterleave processing, bit deinterleave processing, inner code decoding, convolutional deinterleave processing, etc. Performing the OFDM demodulation/transmission path decoding generates a transport stream comprising the TS packet provided with a 16-byte RS parity, for example. Transmission data output from the OFDM demodulator/transmission path decoder 33 is supplied to the RS decoder 34.

Based on the RS parity, the RS decoder 34 Reed-Solomon decodes the transport stream to correct a transmission error. The Reed-Solomon decoded transport stream is supplied to the TS output section 35.

Here, there may be a case where the transport stream causes a transmission error which exceeds the error correction capability. Namely, the transport stream may contain a transmission error even after the Reed-Solomon decoding. In this case, the RS decoder 34 supplies a transmission error flag to the TS packet containing an uncorrected transmission error for output. This transmission error flag is supplied to the TS output section 35.

The TS output section 35 smoothes the transport stream input from the RS decoder 34. At this time, the TS output section 35 outputs the TS packet with the transmission error flag by rewriting an error indicator flag in that packet to 1.

Figure 4:
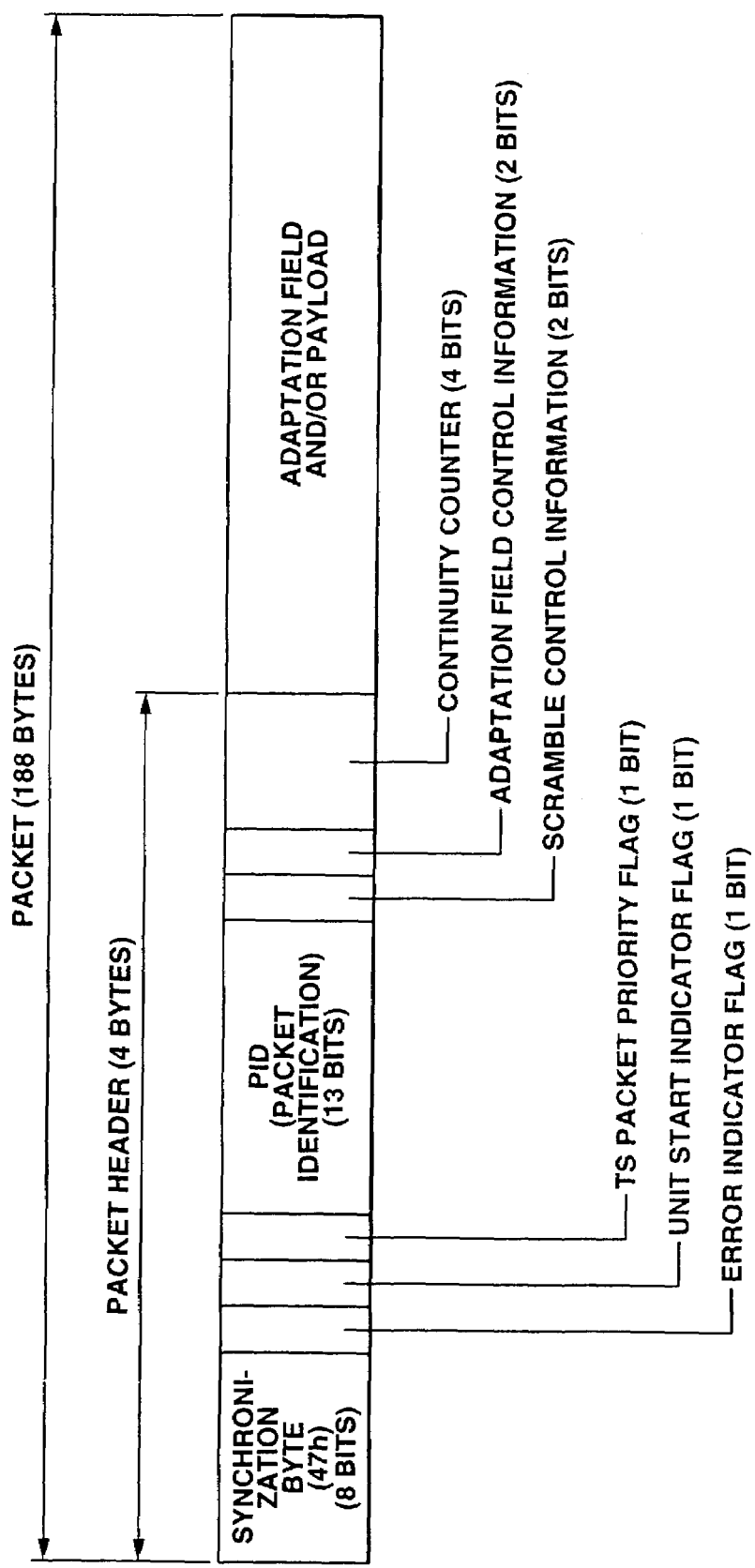
FIG. 4 shows a data configuration of a TS packet specified in the MPEG2 Systems standard.

FIG. 4 shows the data structure of a TS packet specified in the MPEG2 Systems standard.

The TS packet comprises 188 bytes of which first four bytes are used for a packet header and succeeding 184 bytes are used for a payload (including an adaptation field).

The packet header comprises, from the beginning, a synchronization byte (8 bits), an error indicator flag (1 bit), a unit start indicator flag (1 bit), a TS packet priority flag (1 bit), a PID (13 bits), scramble control information (2 bits), adaptation field control information (2 bits), and a continuity counter (4 bits).

The synchronization byte is synchronization information used for an MPEG decoder to detect the beginning of the TS packet and contains a value of 47 h.

The error indicator flag indicates that the TS packet contains an error.

The unit start indicator flag indicates that new packet data is to start from the TS packet.

The TS packet priority flag indicates a priory of the TS packet.

The PID (Packet Identification) is identification information indicating an attribute of the TS packet.

The scramble control information indicates the presence or absence of scramble for the payload in the TS packet and, if any, the type of the scramble.

The adaptation field control information indicates the presence or absence of the adaptation field and the presence or absence of the payload.

The continuity counter maintains information whose value is circularly incremented in the timing axis direction for TS packets with the same PID. By referencing this continuity counter value, the MPEG decoder can identify the order of received packets or detect packets discarded on an ATM line etc.

The TS output section 35 rewrites the error indicator flag following the synchronization byte (47 h) to 1 in the TS packet supplied with the transmission error flag to output a transport stream.

Each reception section 16 supplies the generated transport stream (TS_1 or TS_2) to the succeeding TS synthesizer section 17.

Figure 5:
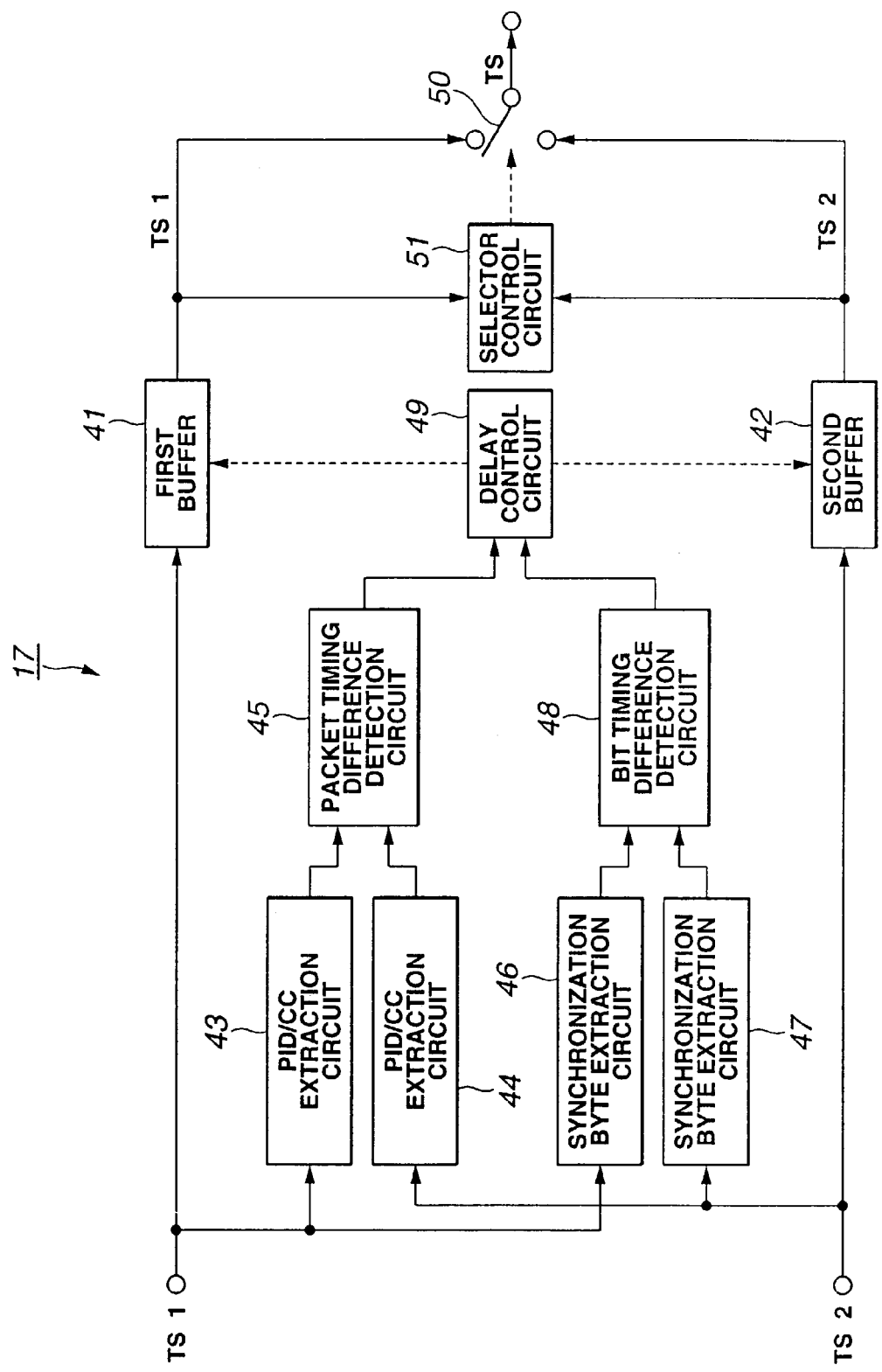
FIG. 5 is a block diagram of a TS synthesizer section in the internal reception unit in the wireless relay system.

The following describes the configuration of the TS synthesizer section 17 in the internal reception unit 14 with reference to FIG. 5.

The TS synthesizer section 17 comprises a first buffer circuit 41, a second buffer circuit 42, a first PID/CC extraction circuit 43, a second PID/CC extraction circuit 44, a packet timing difference detection circuit 45, a first synchronization byte extraction circuit 46, a second synchronization byte extraction circuit 47, a bit timing difference detection circuit 48, a delay control circuit 49, a selector 50, and a selector control circuit 51.

The first buffer circuit 41 is a delay buffer which temporarily stores the input TS_1 in internal memory and delays the output timing. The first buffer circuit 41 sequentially stores the input TS_1 whose output timing the delay control circuit 49 controls.

The second buffer circuit 42 is a delay buffer which temporarily stores the input TS_2 in internal memory and delays the output timing. The second buffer circuit 42 sequentially stores the input TS_2 whose output timing the delay control circuit 49 controls.

The first PID/CC extraction circuit 43 extracts a PID value and a continuity counter value from each TS packet in the input TS_1. The second PID/CC extraction circuit 44 extracts a PID value and a continuity counter value from each TS packet in the input TS_2. The first and second PID/CC extraction circuits 43 and 44 extract synchronization bytes from input transport streams. Based on the synchronization byte positions, these circuits specify description positions of the PID and the continuity counter in the TS packet to extract PID and continuity counter values. The first and second PID/CC extraction circuits 43 and 44 supply the extracted PID and continuity counter values to the packet timing difference detection circuit 45.

The packet timing difference detection circuit 45 detects a timing difference in units of packets between the TS_1 input timing and the TS_2 input timing based on PID and continuity counter values for each TS packet in TS_1 and TS_2. Namely, the packet timing difference detection circuit 45 detects TS packets having the same PID and continuity counter values (i.e., identical TS packets) between the input TS_1 and TS_2. The circuit detects, in units of packets, a timing difference needed for identical TS packets to be input. The detected packet timing is supplied to the delay control circuit 49.

The first synchronization byte extraction circuit 46 extracts a synchronization byte from each TS packet in the input TS_1. The second synchronization byte extraction circuit 47 extracts a synchronization byte from each TS packet in the input TS_2. The first and second synchronization byte extraction circuits 46 and 47 extract a synchronization byte from the input transport stream and supplies an extraction timing of that synchronization byte to the delay control circuit 49 and the bit timing difference detection circuit 48.

Based on the extraction timings of synchronization bytes for TS packets in TS_1 and TS_2, the bit timing difference detection circuit 48 detects bit timing difference between input timings for packets in TS_1 and TS_2. The detected bit timing difference is supplied to the delay control circuit 49.

The delay control circuit 49 adds the supplied packet timing difference and bit timing difference to compute a timing difference between TS_1 and TS_2. Based on the computed timing difference, the delay control circuit 49 controls the TS_1 output timing stored in the first buffer circuit 41 and the TS_2 output timing stored in the second buffer circuit 42. Namely, the delay control circuit 49 controls delay times for TS_1 and TS_2 to completely synchronize TS_1 with TS_2. The synchronized TS_1 and TS_2 are input to the selector 50.

Under control of the selector control circuit 51, the selector 50 selects and outputs stream TS_1 or TS_2 in units of TS packets.

The selector control circuit 51 references error indicator flags in TS packets output from the first and second buffer circuits 41 and 42. The selector control circuit 51 provides switchover control in units of packets so that the selector 50 can select a TS packet with the error indicator flag reset to 0. Namely, the selector control circuit 51 provides switchover control so as to output a transport stream received by the first external reception unit 13a or the second external reception unit 13b whichever causes no transmission error.

The selector 50 outputs a finally synthesized transport stream.

The TS synthesizer section 17 can synchronize transport streams with different transmission timings due to different arrangements of the external reception units 13 by controlling delay amounts for the first and second buffer circuits 41 and 42. More specifically, the synchronization is available on a packet basis by referencing the PID and the continuity counter of each TS packet, and on a bit basis by referencing the synchronization byte of the TS packet. The error indicator flag of each TS packet is used to selectively output TS packets with no errors. This synchronization enables seamless selection of TS_1 or TS_2. It is possible to improve reliability of transport streams to be output by monitoring errors in TS packets and selectively outputting TS packets causing no errors.

As mentioned above, the wireless relay system 1 according to the embodiment of the present invention includes the reception relay station 12 which receives a transmission wave output from the single wireless camera 11. The reception relay station 12 comprises the internal reception unit 14 and a plurality of external reception units 13 arranged with different positions and directivities. Each reception section 16 in the internal reception unit 14 applies OFDM demodulation and transmission path decoding to a signal received from the external reception unit 13. The reception section 16 performs error correction for each demodulated transport stream. The reception section 16 sets the error indicator flag to 1 for outputting a TS packet causing a transmission error which exceeds the error correction capability. The TS synthesizer section 17 in the internal reception unit 14 completely synchronizes a plurality of received transport streams by referencing the synchronization bytes, PID, and continuity counter values. This section selects TS packets causing no errors and synthesizes them into a single digital data sequence.

The wireless relay system 1 according to the embodiment of the present invention can enhance a movable range of the wireless camera 11 for mobile photography, increase its mobility, and improve the transmission quality.

The embodiment of the present invention has been described by using the configuration example which transmits an IF signal from the external reception unit 13. It may be also preferable to provide the OFDM demodulator/transmission path decoder 33, the RS decoder 34, etc. in the external reception unit 13 rather than in the internal reception unit 14 and output transport streams from the external reception unit 13.

While there has been described the example of transmitting a transmission signal, i.e., a transport stream specified in the MPEG2 Systems standard, any transmission signal may be applicable only if it is an error-corrected digitally coded signal.

While there has been described the OFDM-based mobile relay system as a transmission wave modulation system, any modulation system may be applicable.

While the embodiment of the present invention has been described with respect to the mobile relay system used for broadcasting, the present invention is not limited thereto. The present invention is also applicable to security monitoring systems, home appliances, etc. The transmitting side can use not only a camera apparatus, but also any other apparatuses which transmit data wirelessly.

INDUSTRIAL APPLICABILITY

The wireless receiver and the method thereof according to the present invention uses a plurality of reception sections to receive a signal transmitted wirelessly from a single transmitter. Each reception section demodulates a digital data sequence and error-corrects the demodulated digital data sequence. The wireless receiver synchronizes a plurality of digital data sequences output from the respective reception sections. According to transmission error states of the digital data sequences, the wireless receiver selects one of a plurality of synchronized digital data sequences for synthesis into a single digital data sequence.

The wireless receiver and the method thereof according to the present invention can ensure the transmitter's mobility by enhancing a movable range of the transmitter for mobile transmission and improve the transmission quality.

The invention claimed is:

1. A wireless receiver comprising:
   a plurality of external reception means for receiving a signal transmitted wirelessly from one transmitter;
   an internal reception unit connected to the plurality of external reception means, the internal reception unit comprising:
     a plurality of internal reception means for demodulating a digital data sequence, and error-correcting a demodulated digital data sequence, the internal reception means each being connected to a respective external reception means via intermediate frequency cables;
     synchronization means connected to the plurality of internal reception means for synchronizing a plurality of digital data sequences received by the external reception means and transmitted to the internal reception means via the intermediate frequency cables; and
     synthesis means connected to the synchronization means for synthesizing a plurality of synchronized digital data sequences and outputting one digital data sequence,
     wherein said synthesis means selects one of a plurality of digital data sequences to be synthesized according to a transmission error state of each digital data sequence.

2. The wireless receiver according to claim 1, wherein each internal reception means provides a digital data sequence to the synchronization means, the digital data sequence containing a transmission error even after error correction processing with error indication information indicating that the transmission error is contained therein; and
   wherein said synthesis means selects one of a plurality of digital data sequences based on said error indication information for synthesis into a single digital data sequence.

3. The wireless receiver according to claim 2, wherein said synthesis means selects a digital data sequence having no transmission error based on said error indication information for synthesis into a single digital data sequence.

4. The wireless receiver according to claim 1, wherein respective external reception means are arranged at spatially different positions.

5. The wireless receiver according to claim 1, wherein respective external reception means have antennas having different directivities.

6. The wireless receiver according to claim 1, wherein said digital data sequence is a transport stream specified in the MPEG2 Systems standard.

7. The wireless receiver according to claim 6, wherein said transport stream is provided with a Reed-Solomon code as an error correction code;
   wherein each internal reception means performs Reed-Solomon decoding as error correction processing for said transport stream and, when said transport stream causes a transmission error exceeding the error correction capability of the Reed-Solomon decoding, provides each transport stream packet (TS packet) to the synchronization means with an error indicator flag indicating that a transmission error is contained; and
   wherein said synthesis means detects said error indicator flag from each transport stream, selects a TS packet based on said detected error indicator flag, and synthesizes a plurality of transport streams into one transport stream.

8. The wireless receiver according to claim 7, wherein each internal reception means and synthesis means use an error indicator bit in a TS packet as said error indicator flag.

9. The wireless receiver according to claim 1, wherein said synchronization means comprises delay memory to delay each digital data sequence and a synchronization control section to control and synchronize delay amounts of respective digital data sequences.

10. The wireless receiver according to claim 9, wherein said digital data sequence is a transport stream specified in the MPEG2 Systems standard.

11. The wireless receiver according to claim 10, wherein said synchronization control section in said synchronization means controls said delay amount in units of transport stream packets (TS packets) to synchronize respective transport streams based on an PID (Packet Identification) and a continuity counter value in a TS packet.

12. The wireless receiver according to claim 10, wherein said synchronization control section in said synchronization means controls said delay amount in units of transport stream packets (TS packets) to synchronize respective transport streams based on a synchronization byte in a TS packet.

13. The wireless receiver according to claim 10, wherein said synchronization control section in said synchronization means controls said delay amount in units of transport stream packets (TS packets) to synchronize respective transport streams based on a PID (Packet Identification), a continuity counter value, and a synchronization byte in a TS packet.

14. A radio reception method comprising:
receiving a signal transmitted wirelessly from one transmitter using a plurality of receivers;
demodulating a digital data sequence and error-correcting the demodulated digital data sequence using an internal reception unit connected externally via intermediate frequency cables to said plurality of receivers;
synchronizing a plurality of digital data sequences received by respective receivers; and
selecting one of a plurality of synchronized digital data sequences according to transmission error states of respective digital data sequences for synthesis into a single digital data sequence and outputting one synthesized digital data sequence.

15. The radio reception method according to claim 14, said method comprising:
providing a digital data sequence containing a transmission error even after error correction processing with error indication information indicating that the transmission error is contained therein; and
selecting one of a plurality of digital data sequences based on said error indication information for synthesis into a single digital data sequence.

16. The radio reception method according to claim 15, said method comprising:
selecting a digital data sequence having no transmission error based on said error indication information for synthesis into a single digital data sequence.

17. The radio reception method according to claim 14 further comprising:
arranging respective receivers at spatially different positions.

18. The radio reception method according to claim 14, wherein respective receivers use antennas having different directivities to receive a signal transmitted wirelessly.

19. The radio reception method according to claim 14, wherein said digital data sequence is a transport stream specified in the MPEG2Systems standard.

20. The radio reception method according to claim 19, said method comprising:
providing said transport stream with a Reed-Solomon code as an error correction code;
performing Reed-Solomon decoding as error correction processing for said transport stream and, when said transport stream causes a transmission error exceeding the error correction capability of the Reed-Solomon decoding, providing each transport stream packet (TS packet) with an error indicator flag indicating that a transmission error is contained; and
detecting said error indicator flag from each transport stream, selecting a TS packet based on said detected error indicator flag, and synthesizing a plurality of transport streams into one transport stream.

21. The radio reception method according to claim 20, said method comprising:
using an error indicator bit in a TS packet as said error indicator flag.

22. The radio reception method according to claim 14, said method comprising:
delaying respective digital data sequences by storing them in memory and synchronizing transport streams by controlling delay amounts of respective digital data sequences.

23. The radio reception method according to claim 22, wherein said digital data sequence is a transport stream specified in the MPEG2 Systems standard.

24. The radio reception method according to claim 23, said method comprising:
controlling said delay amount in units of transport stream packets (TS packets) to synchronize respective transport streams based on a PID (Packet Identification) and a continuity counter value in a TS packet.

25. The radio reception method according to claim 23, said method comprising:
controlling said delay amount in units of transport stream packets (TS packets) to synchronize respective transport streams based on a synchronization byte in a TS packet.

26. The radio reception method according to claim 23, said method comprising:
controlling said delay amount in units of transport stream packets (TS packets) to synchronize respective transport streams based on a PID (Packet Identification), a continuity counter value, and synchronization byte in a TS packet.

* * * * *